(12) United States Patent
Brown et al.

(10) Patent No.: US 7,509,281 B1
(45) Date of Patent: Mar. 24, 2009

(54) SYSTEM AND METHOD FOR STATEMENT PRESENTATION

(75) Inventors: Matthew Brown, Coral Springs, FL (US); Marc Jazvac, Boca Raton, FL (US)

(73) Assignee: Convergys CMG Utah, Inc., South Jordan, UT (US)

( * ) Notice: Subject to any disclaimer, the term of this patent is extended or adjusted under 35 U.S.C. 154(b) by 620 days.

(21) Appl. No.: 09/709,993

(22) Filed: Nov. 10, 2000

Related U.S. Application Data

(60) Provisional application No. 60/165,296, filed on Nov. 12, 1999.

(51) Int. Cl.
*G06Q 40/00* (2006.01)
(52) U.S. Cl. .............. 705/37; 705/38; 705/36; 705/35
(58) Field of Classification Search .......... 705/34, 705/38, 14, 37, 40, 33, 70, 30, 35; 235/379, 235/380; 395/234; 380/5; 379/121; 707/2
See application file for complete search history.

(56) References Cited

U.S. PATENT DOCUMENTS

| | | | | |
|---|---|---|---|---|
| 3,842,248 A | * | 10/1974 | Yarnell et al. ................. | 705/34 |
| 3,852,571 A | * | 12/1974 | Hall et al. .................... | 235/379 |
| 4,485,300 A | * | 11/1984 | Peirce ........................ | 235/380 |
| 4,611,094 A | | 9/1986 | Asmuth et al. ........... | 179/7.1 TP |
| 5,003,584 A | | 3/1991 | Benyacar et al. ............ | 379/119 |
| 5,483,445 A | | 1/1996 | Pickering | |
| 5,696,906 A | * | 12/1997 | Peters et al. .................. | 705/34 |
| 5,745,883 A | | 4/1998 | Krist et al. .................... | 705/34 |
| 5,761,650 A | | 6/1998 | Munsil et al. ................. | 705/34 |
| 5,784,443 A | | 7/1998 | Chapman et al. ............ | 379/119 |
| 5,822,411 A | | 10/1998 | Swale et al. | |
| 5,852,659 A | | 12/1998 | Welter, Jr. ................... | 379/116 |
| 5,852,825 A | | 12/1998 | Winslow ....................... | 707/6 |
| 5,884,284 A | | 3/1999 | Peters et al. .................. | 705/30 |
| 5,943,406 A | | 8/1999 | Leta et al. .................... | 379/120 |
| 5,945,653 A | * | 8/1999 | Walker et al. ............... | 235/380 |
| 5,946,386 A | | 8/1999 | Rogers et al. ............... | 379/265 |
| 5,995,946 A | * | 11/1999 | Auzenne et al. ............... | 705/34 |
| 6,266,401 B1 | | 7/2001 | Marchbanks et al. | |
| 6,292,789 B1 | * | 9/2001 | Schutzer ...................... | 705/40 |
| 6,385,655 B1 | | 5/2002 | Smith et al. | |
| 6,493,685 B1 | | 12/2002 | Ensel et al. | |
| 6,839,687 B1 | * | 1/2005 | Dent et al. .................... | 705/40 |
| 2002/0026394 A1 | * | 2/2002 | Savage et al. ................. | 705/34 |

OTHER PUBLICATIONS

A new way to pay Anonymous. Risk Management. New York: Apr. 1998. vol. 45, Iss. 4; p. 12, 1 pgs.*

(Continued)

*Primary Examiner*—Kambiz Abdi
*Assistant Examiner*—Clement Graham
(74) *Attorney, Agent, or Firm*—Frost Brown Todd LLC

(57) ABSTRACT

The present invention is a system and method for producing statements that have charges for one or more service categories. The present invention enables a service provider to define which services appear on what statements for any given customer. Using the present invention, it is possible to include telephony, cable, video, and/or data services on the same statement, separate statements, or any combination of services on one or more statements.

34 Claims, 11 Drawing Sheets

Figure 1:
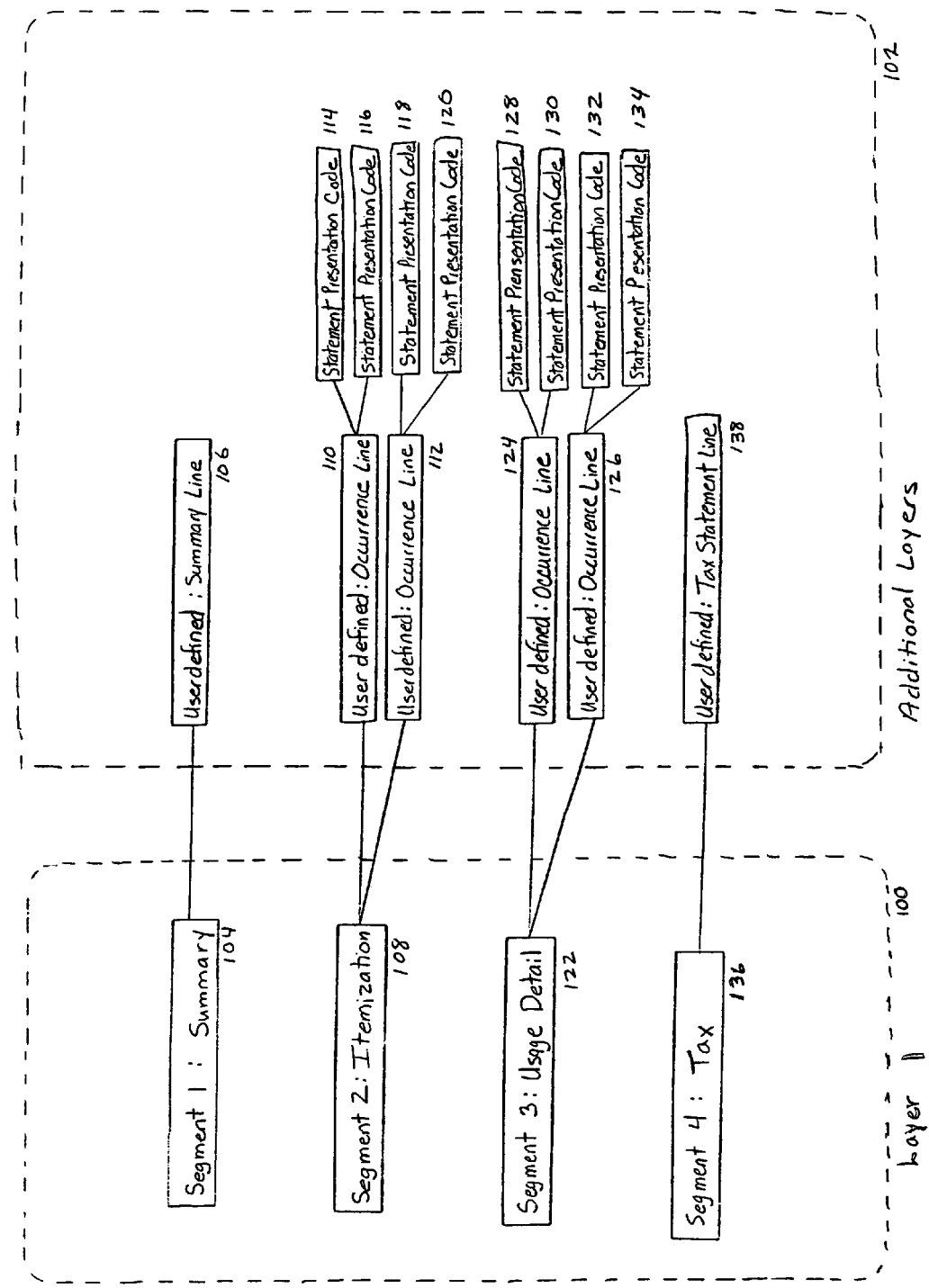

```
CBE3M7R    ADD      Statement Presentation Code Maintenance 3 Site ID :   001

Presentation Code  . . . :  009
Presentation Description :

Q/R/S/G   Additional outlet descriptions for premium services.
          Paragraph .  _____    Detail . . .  _____

Q/R/S/G   Additional outlet descriptions for auxiliary services.
          Paragraph .  _____    Detail . . .  _____

Bottom

F3=Exit   F15=Menu
```

OTHER PUBLICATIONS

Office Action Dated Feb. 25, 2004 for U.S. Appl. No. 09/710,651.
Office Action Dated Sep. 15, 2003 for U.S. Appl. No. 09/710,651.
Office Action Dated Aug. 27, 2002 for U.S. Appl. No. 09/710,651.
Office Action Final Rejection for U.S. Appl. No. 09/570,150, filed on Aug. 12, 2005.
Office Action Non-Final Rejection for U.S. Appl. No. 09/570,150, filed on Feb. 8, 2005.
Office Action Non-Final Rejection for U.S. Appl. No. 09/570,150, filed on Aug. 26, 2004.
Office Action Final Rejection for U.S. Appl. No. 09/570,150, filed on Feb. 12, 2004.
Office Action Final Rejection for U.S. Appl. No. 09/570,150, filed on Oct. 21, 2003.
Office Action Non-Final Rejection for U.S. Appl. No. 09/570,150, filed on Apr. 14, 2003.
Office Action Final Rejection for U.S. Appl. No. 09/570,150, filed on Mar. 22, 2002.
Office Action Non-Final Rejection for U.S. Appl. No. 09/570,150, filed on Aug. 7, 2001.
Information Disclosure Statement for U.S. Appl. No. 09/570,150, filed on Nov. 13, 2000.
Information Disclosure Statement for U.S. Appl. No. 09/570,150, filed on Nov. 1, 2000.
Original Application for U.S. Appl. No. 09/570,150, filed May on 12, 2000.
Office Action Final Rejection for U.S. Appl. No. 09,709,942, filed on Mar. 4, 2005.
Office Action Non-Final Rejection for U.S. Appl. No. 09/709,942, filed on Oct. 8, 2004.
Office Action Final Rejection for U.S. Appl. No. 09/709,942, filed on May 6, 2004.
Office Action Non-Final Rejection for U.S. Appl. No. 09/709,942, filed on Sep. 25, 2003.
Information Disclosure Statement for U.S. Appl. No. 09/709,942, filed on Sep. 9, 2001.
Original Application for U.S. Appl. No. 09/709,942, filed on Nov. 10, 2000.
Office Action Final Rejection for U.S. Appl. No. 09/710,651, filed Jul. 6, 2004.
Information Disclosure Statement for U.S. Appl. No. 09/710,651, filed on May 24, 2004.
Office Action Non-Final Rejection for U.S. Appl. No. 09/710,651, filed on Feb. 25, 2004.
Office Action Final Rejection for U.S. Appl. No. 09/710,651, filed on Sep. 15, 2003.
Office Action Non-Final Rejection for U.S. Appl. No. 09/710,651, filed on Aug. 27, 2002.
Information Disclosure Statement for U.S. Appl. No. 09/710,651, filed on Nov. 10, 2000.
Original Application for U.S. Appl. No. 09/710,651, filed on Nov. 10, 2000.
U.S. Appl. No. 09/570,150.
U.S. Appl. No. 09/709,942.
U.S. Appl. No. 09/710,651.

* cited by examiner

```
CBDFYJR     DISPLAY     System Parameter Maintenance      Site ID :    001
 System Category _____

Statement Presentation

Type options, press Enter.
 1=Select     6=Print Individual Category      8=Copy Site ID ?    Category
  _    Statement Attributes
  _    Statement Attribute Assignment
  _    Statement Presentation Codes
  _    Statement Font Codes
  _    Statement Occurrence Line
  _    Statement Section Codes
  _    Statement Summary Line F3=Exit   F6=Print ALL Category    F15=Menu
```

Fig. 2

```
CBDFNAR    DISPLAY    Statement Attribute Code Maintenance    Site ID :   001
  Statement Attribute Code ___

Type options, press Enter.
 2=Change    3=Copy    4=Delete

?  Statement
     Attribute
     Code       Description
  _    A        CABLE SERVICE
  _    B        CABLE SERVICE
  _    C        DIGITAL CABLE MODEM PURCHASE
  _    D        ABC@HOME
  _    E        ABC@HOME
  _    AA       CABLE SERVICE
  _    CC       HIGH SPEED DATA
  _    DD       DIGITAL CABLE MODEM PURCHASE
  _    EE       ABC@HOME
  _    AAX      THIS IS A TEST
  _    A1       NANE
  _    A2
  _    CCC      DEFAULT (BILL DESC Q)
                                                            More...
 F3=Exit   F9=Add   F15=Menu
```

Fig. 3

```
CXE1AJR    CHANGE   Statement Attribute Code Maintenance 1   Site ID :   001
  Statement Attribute Code   CAB
  Statement Attribute Desc   CABLE ACCOUNTS_____

Statement Threshold Number of Lines:    Per Statement  _1_    Per Page _1_
       Include the following in Line Count (Y/N):
          Summary  N      Itemization  N      Billing Message  N
          Taxes    N      Usage Detail N      Statement Text   N Output Taxes by Service Category . . . . . . . . . . . . . . . .  N   (Y/N)

Include Memo Accounts . . . . . . . . . . . . . . . . . . . . .   N   (Y/N)

Check Digit Routine . . . . . . . . . . . . . . . . . . . . . .   A   (A/X)
 Lock Box Scan Line Routine  . . . . . . . . . . . . . . . . . .   A   (A/C/X)

Previous Balance Stmt Presentation Code . . . . . . . . . . . .   150

Bucket number to start from when calculating past due amount  .   1   (1-6)
                                                                    More...
 F3=Exit    F15=Menu
```

Fig. 4

Fig. 5

```
CXPVAKR     ENTER     Statement Attribute Maintenance 2    Site ID :    001

Statement Attribute Code        501
Statement Attribute Desc   Telephone

Credit Balance Accounts (Balance < 0.00):
Print if the customer's status indicates to print a Credit Bill . .   X  (Y/N)
Print a final bill, regardless of the customer's status . . . . . .  N  (Y/N)
Message: _____

Debit Balance Accounts (Balance >= 0.00):
Do Not print statements with a debit balance less than  . . .  _____.00_
Print a final bill, regardless of the debit balance  . . . . . . . . X  (Y/N)

Regardless of balance, accounts with other than normal transactions:
Should be producted for All customers . . . . . . . . . . . . . . .  N  (Y/N)
Should be produced for Non-monthly bill mode customers only . . . .  N  (Y/N)
Message: _____
                                                                  More.

F3=Exit   F15=Menu
```

Fig. 6

```
CXPVAMR     ENTER     Statement Attribute Maintenance 3    Site ID :    001

Statement Attribute Code   CAB
Statement Attribute Desc   CABLE ACCOUNTS

Description to print in the statement for:
  Previous month's balance
    First Statement                        _____
    Subsequent Statements                  _____

Payments
    Full Payment                           _____
    Partial Payment                        _____
    Deposit Payment                        _____

Services without a description           _____

Merged Prorate Description
    First Statement                        _____
    Subsequent Statements                  _____

More...

F3=Exit   F15=Menu
```

Fig. 7

```
CXPVAQR     ENTER     Statement Attribute Maintenance 4    Site ID :    001

Statement Attribute Code   CAB
Statement Attribute Desc   CABLE ACCOUNTS

Direct Debit Messages
Message to print if statements are:
Sent Each Month     _____
Pre-note status     _____

Message to print if statements are not sent monthly and
Other than a normal transaction occurs:
_____

Maximum amount allowed: . . . . . . . . . . .  _____.00
Message to print if Maximum Amount is exceeded:
_____

Minimum Amount allowed: . . . . . . . . . . .  _____.00
Message to print if minimum amount is not met:
_____

F3=Exit   F15=Menu
```

Fig. 8

```
CXEPEXR     CHANGE  Statement Attribute Assignment Maintenance  Site ID : 001

Service Cat Combo:

Stmt
     Attr   Service Category Combo
      ___           C
      ___           CD
      ___           CDL
      ___           CDLS
      ___           CDLST
      ___           CDLT
      ___           CDS
      ___           CDST
      ___           CDT
      ___           CL
      ___           CLS
      ___           CLST
      ___           CLT
      ___           CS
      ___           CST
                                                                   More...
  F3=Exit  F15=Menu
```

Fig. 9

```
CBDFNAR     DISPLAY    Statement Presentation Code Maintenance  Site ID : 001
   Presentation Code ___

Type options, press Enter.
  2=Change    3=Copy    4=Delete    P=Paragraph

?  Prstn  Presentation
     Code   Description
  _   A     CABLE SERVICE
  _   B     CABLE SERVICE
  _   C     DIGITAL CABLE MODEM PURCHASE
  _   D     ABC@HOME
  _   E     ABC@HOME
  _   AA    CABLE SERVICE
  _   CC    HIGH SPEED DATA
  _   DD    DIGITAL CABLE MODEM PURCHASE
  _   EE    ABC@HOME
  _   A1    NANE
  _   CCC   DEFAULT (BILL DESC Q)
                                                                   More...
  F3=Exit  F9=Add  F15=Menu
```

Fig. 10

```
CXE1HDR     ADD          Statement Presentation Code     Site ID : 001

Stmt Presentation Code . :  SLG _____

Header     _____
  Subtotal   _____
  Footer     _____

Section Code ___
  Summary Line ___

Sort Within Occurrence _                   Print Usage Detail Flag  N
     If No, Sort Occurrence Ctg/Seq# _ ___   Discount/Retail for Usage D Stmt Presentation for Prorates . .  ___

Font Codes: Header _
              Detail _
              Footer _

Offset Spaces: Descriptions (from left) ___   Lines to Skip: Before Header _
                 Amounts (from right)     ___                  After Footer  _

F3=Exit  F15=Menu  F18=Paragraph
```

```
CBE3M7R    ADD      Statement Presentation Code Maintenance 1  Site ID :   001

Presentation Code  . . . :   009
Presentation Description .  _____

Billing descriptions to use on the bills and ledger  . . . .  _  (M/P/R/S/Q/G)

M/P/Q/R/S/G   Print zero rated primary services?  . . . . . . .  _  (Y/N)

Q/R/S/G       Itemize additional outlet charges?  . . . . . . .  _  (Y/N)
Q/R/S/G          Print zero rated additional outlet counts  .   _  (Y/N)
Q/R/G            Print additional rates for services  . . . .   _  (Y/N)

Q/R/G         Include a la carte rates in the paragraph  . .    _  (Y/N)
Q/G           Insertion character to use to join the rate to
              the short description . . . . . . . . . . . .     _

Q/R/G         Print summary lines after paragraph exit line?    _  (Y/N)

More...

F3=Exit    F15=Menu
```

Fig. 11

```
CBE3M7R    ADD      Statement Presentation Code Maintenance 2  Site ID :   001

Presentation Code  . . . :   009
Presentation Description :

Q/R/G     Number of Matrix Description Lines to Print . . . . . . . .

P/Q/R/G   Intro Line . . . . . . .    _____
P/Q/R/G   Exit Line  . . . . . . .    _____

Q/R/G     Summary lines to print after the paragraph exit line.
                                      _____
                                      _____
                                      _____

Q/R/G     Alternate summary line if no applicable discount.
                                      _____

More...

F3=Exit    F15=Menu
```

Fig. 12

```
CBE3M7R    ADD      Statement Presentation Code Maintenance 3  Site ID :   001

Presentation Code  . . . :   009
Presentation Description :

Q/R/S/G   Additional outlet descriptions for premium services.
          Paragraph .  _____         Detail . . .   _____

Q/R/S/G   Additional outlet descriptions for auxiliary services.
          Paragraph .  _____         Detail . . .   _____

Bottom

F3=Exit    F15=Menu
```

Fig. 13

Fig. 14

```
CXEFGRR      CHANGE      Statement Font Code Maintenance      Site ID :      001

Font Code .

Type options, press Enter.
  4=Delete

?  Font
     Code   Description
  _  B      Bold
  _  BI     Bold, Italics
  _  Bl     Bold, Large
  _  I      Italic
  _  U      Underline
  _  Ul     Underline, bold, large print F3=Exit    F9=Add    F15=Menu
```

Fig. 15

```
CXDPGTR      DISPLAY    Statement Occurrence Line Maintenance  Site ID :    001

Service Category

Type options, press Enter.
  2=Change    4=Delete

Svc
  ?  Ctg    Itemization Header
  _  C      Cable Bill
  _  D      High Speed Data User
  _  L      Calling Card # &L
  _  S      Circuit ID &I
  _  T      Phone Bill F3=Exit    F9=Add    F15=Menu
```

Fig. 16

```
CXE1GWR      ADD        Statement Presentation Occurrence      Site ID :    001

Service Category Code .

F3=Exit    F15=Menu
```

Fig. 17

```
CXE1GWR      CHANGE      Statement Presentation Occurrence    Site ID :   001

Service Category Code . :    C   Cable

Itemization Segment
    Header   Cable Bill_____
    Subtotal _____
    Footer   _____

Usage Detail Segment
    Header   _____
    Subtotal _____
    Footer   _____
  Font Codes:
    Header  __
    Footer  __

Offset Number of Spaces:                 Number of Lines to Skip:
    Descriptions (from left)  __              Before Header  _
    Amounts (from right) .    __              After Footer   _

F3=Exit   F15=Menu
```

Fig. 18

```
CXDFGYR      DISPLAY      Statement Section Maintenance        Site ID :   001

Section Code

Type options, press Enter.
  2=Change   3=Copy   4=Delete

?  Section
     Code       Header Description
     _   1      Statement Payments & Adjustments
     _ 101      Telephone Services
     _ 201      Video Services
     _ 301      High Speed Data Services F3=Exit   F9=Add   F15=Menu
```

Fig. 19

```
CXE1GZR      ADD         Statement Presentation Section       Site ID :   001

Section Code .  __

F3=Exit   F15=Menu
```

Fig. 20

```
CXE1GZR      ADD         Statement Presentation Section       Site ID :   001

Section Code . . . . . .    128

Header   _____
  Subtotal _____
  Footer   _____

Font Codes:
    Header  __
    Footer  __

Offset Number of Spaces:
    Descriptions (from left)  __
    Amounts (from right) .    __

Number of Lines tSkip:
    Before Header  _
    After Footer   _

F3=Exit   F15=Menu
```

Fig. 21

```
CXEFHFR      CHANGE         Statement Summary Lines          Site ID :      001

Summary Line Number .

Type options, press Enter.
4=Delete
                                                                     Section
  ?   Sum                                                            Code
      Line   Description
  _      3   Cable_____101
  _      7   Telephone_____7
  _    123   High Speed Data_____66
  _    124   Special Circuits_____1
  _    888   Calling Cards_____1

F3=Exit    F9=Add    F15=Menu
```

Fig. 22

```
CXEFHFR      ADD            Statement Summary Lines          Site ID :      001

Type options, press Enter.
4=Delete
                                                                     Section
  ?   Sum                                                            Code
      Line   Description
  _   ___    _____  __
  _   ___    _____  __
  _   ___    _____  __
  _   ___    _____  __
  _   ___    _____  __

F3=Exit    F9=Change    F15=Menu
```

Fig. 23

```
CBDFNIR      DISPLAY        Method Of Payment Maintenance

Call Center Grouping Code :   01
Method of Payment Code   . .  _

Type options, press Enter.
2=Change   3=Copy   4=Delete

?   Code  Description
  _      1  CASH
  _      2  CHECK
  _      3  MONEY ORDER
  _      5  LOCKBOX
  _      7  DIRECT DEBIT
  _      8  GIFT CERTIFICATE
  _     10  MASTERCARD
  _     11  VISA-13
  _     12  DISCOVER
  _     14  VISA-16

F3=Exit    F9=Add    F15=Menu
```

Fig. 24

```
CBE1Q0R     ADD         Customer Method of Payment Code Maint

Call Center Grouping Code  . . . . :  01
Customer Method of Payment Code . :  555
Description  . . . . . . . . . . . .  _____

Category Call Center Grouping Code :  01
Payment Code Category  . . . . . . .  __
Vendor Call Center Grouping Code . :  01
MOP Processing Vendor  . . . . . . .  __

Method of Payment Acct Nbr Required
Method of Payment Acct Nbr Validation  _
Method of Payment Acct Maximum Length  _    Opr .__  (EQ/LT/LE)
Method of Payment Acct Minimum Length  _    Opr .__  (GT/GE)

Default Stmt Prsn Code  . . . .       __

Counter Cash Allowed . . . . . . . .  _ (Y/N)
Check Number Required  . . . . . . .  _ (Y/N)
Track History  . . . . . . . . . . .  _ (Y/N)
Prenote Required . . . . . . . . . .  _ (Y/N)
F3=Exit   F10=Stmt Prsn Cds   F15=Menu
```

Fig. 25

```
CXEFKTR    CHANGE    Maintain Stmt Prsn Code for MOP      Site ID :   001
    Site   215   MOP Code    2

Type options, press Enter.
4=Delete

?  Srv   AR     Stmt   Stmt
    Ctg   Code   Prsn   Presentation Desc
                 Code
 _  C     1      CAB    CABLE SERVICE
 _  T     5      TEL    TELEPHONE SERVICE
 _  _     __     ___
 _  _     __     ___
 _  _     __     ___
 _  _     __     ___
 _  _     __     ___
 _  _     __     ___
 _  _     __     ___
                                                                  More...

F3=Exit    F9=Add    F15=Menu
```

Fig. 26

```
CXDPA3R    DISPLAY      Usage Type Maintenance         Site ID :   001
   Usage Type  _____

Type options, press Enter.
C=Carrier Attr  2=Change  4=Delete

Usage                                    Stmt   Stmt   AR     G/L
 ?  Type   Description                       Pres   Code   Code   Minor
 _  00001  Local Call - Direct Dial           605    DD     3      789
 _  00002  Local Calling Card                 605    CC     3      791
 _  00003  Local Operator Person-to-Person    605    PP     3      795
 _  00004  Local Operator Collect             605    CC     3      795
 _  00005  Local Op Station-to-Station Type 2 605    SN     3      789
 _  00006  Local Op Station-to-Station Type 1 605    SN     3      789
 _  00007  Intrastate Direct Dial             625    DD     3      775
 _  00008  Intrastate Calling Card            625    CC     3      796
 _  00009  Intrastate Op Person-to-Person     625    PP     3      792
 _  00010  Intrastate Operator Collect        625    CC     3      792
 _  00011  Intrastate Station-to-Station      625    SN     3      775
 _  00012  Intrastate Op Station-to-Station   625    SN     3      792

F3=Exit    F9=Add    F15=Menu
```

Fig. 27

```
CXE1KMR      ADD           Usage Type Maintenance          Site ID :    001
  Usage Type   ____

F3=Exit    F15=Menu
```

Fig. 28

```
CXE1KMR      ADD           Usage Type Maintenance          Site ID :    001
  Usage Type  TEST1
  Description . .          _____

AR Code . . . .          __

Presentation Code        __

Tax Group Code           ____

G/L Minor Nbr .          ____

Stmt Rate Code           __

F3=Exit    F15=Menu
```

Fig. 29

```
CXEFLCR      CHANGE        Usage Plan Maintenance          Site ID :    001
  Usage Plan ID .

Type options, press Enter.
  C=Carrier Override  4=Delete

? Plan   Plan                                              Stm  Stm
    ID     Description                                       Prs  Ind
  _ 00099  Direct Dial - Local                               410   Y
  _ 12345  Direct Dial - Long Distance                       455   N
                                                                Bottom
  F3=Exit   F9=Add   F15=Menu
```

Fig. 30

```
CXEFLCR      ADD           Usage Plan Maintenance          Site ID :    001

Type options, press Enter.
  C=Carrier Override  4=Delete

? Plan   Plan                                              Stm  Stm
    ID     Description                                       Prs  Ind
  _ ____   _____  ___  _
  _ ____   _____  ___  _
  _ ____   _____  ___  _
  _ ____   _____  ___  _
  _ ____   _____  ___  _
  _ ____   _____  ___  _
  _ ____   _____  ___  _
                                                                More...
  F3=Exit   F9=Change   F15=Menu
```

```
CXEFLIR    CHANGE          Usage Plan - Carrier Override      Site ID :   001

Plan 12345

Carrier ____

Type options, press Enter.
4=Delete

? Carrier  Carrier                                   Stmt
   ID      Description                               Pres
_  00562   lOCAL Telecom                             105
_  00071   Universal Telecom                         TEL Bottom
F3=Exit   F9=Add    F15=Menu
```

Fig. 31

```
CXEFLIR    ADD             Usage Plan - Carrier Override      Site ID :   001

Plan 5

Type options, press Enter.
4=Delete

? Carrier  Carrier                                   Stmt
   ID      Description                               Pres
_  ___     _____                                    ___
_  ___     _____                                    ___
_  ___     _____                                    ___
_  ___     _____                                    ___

More...
F3=Exit   F9=Change  F15=Menu
```

Fig. 32

SYSTEM AND METHOD FOR STATEMENT PRESENTATION

This application claims priority to U.S. Provisional Patent Application Ser. No. 60/165,296, filed on Nov. 12, 1999.

BACKGROUND OF THE INVENTION

1. Field of the Invention

The present invention relates generally to production of billing statements. Particularly, the present invention relates the production of billing statements for different services and the production of a single billing statement for telephone, cable, and data services.

2. Description of Related Art

Service providers such as local telephone service providers, long distance telephone service providers, and cable television service providers typically produce and send their customers monthly billing statements that reflect charges based on transactions such as telephone calls, pay per view requests, etc. that occurred during the month. Typically, separate statements are produced and sent for each service because each service is subject to different messages, notices, inserts, taxes, collection procedures, etc. Furthermore, there are often physical limitations with respect to the printed bill such that all of the information the service provider would like to print on the bill cannot be accommodated. Current statement production systems impose further limitations by providing few formatting and layout options to service providers. Service providers today need flexibility in defining the format and layout options for billing statements and further need the ability to generate one billing statement for accounts having any combination of telephone, cable, and/or data services.

SUMMARY OF THE INVENTION

The present invention is a system and method for producing (e.g., printing or displaying) statements that have charges for one or more service categories. The present invention enables a service provider to define which services appear on what statements for any given customer. The present invention is directed to Statement Presentation which refers to the collating, grouping, summarizing, and describing of transactions for a statement. The present invention allows a service provider to group, summarize, and order like statement transactions for a particular service category (e.g., telephone service, cable service, and data service). Statement transactions are defined generally to be different charges for various activities or tasks such as payments and adjustments, recurring service charges, one time charges for installations, deposits, etc., usage of telephony, cable, or data services, taxes, etc.) for one or more occurrences. An occurrence on a statement relates to a telephone line that has an associated telephone number or an equipment outlet that has an associated equipment outlet number (preferably, 5 digits). The equipment outlet number defines which addressable services are associated with which equipment and are assigned to a particular outlet.

The present invention subdivides statement transactions into several layers for presentation on a statement. At the highest layer are four Segments: Summary, Itemization, Usage Detail, and Tax. These Segments are subdivided into User-Defined Sections, which are groups of a lower presentation layer. These lower presentation layers vary by the Segment type. The presentation layer for the Summary Segment is the Summary Line. The presentation layer for the itemization and Usage Detail Segments consists of presentation Occurrences, which are subdivided by Statement Presentation Codes. The presentation layer for the Tax Segment is the Tax Statement Line.

The present invention uses Statement Presentation Codes to determine how transactions are grouped and produced (e.g., printed or displayed) on a statement. Services, pay per view (PPV) events, payments and adjustments, recurring service charges, one-time charges, usage, etc. are assigned a Statement Presentation Code. Each Statement Presentation Code has a group of attributes that defines how information related to the code may be printed or viewed. In a preferred embodiment of the present invention, the Statement Presentation Code attributes include a Section Code that determines where on the statement to print the Statement Presentation Code, a Summary Line to which transaction amounts are added, and an indicator to determine whether the Statement Presentation Code should be sorted within an occurrence.

The Statement Presentation Sections of the present invention provide a means for grouping Statement Presentation Codes. Certain transactions, such as payments, that are not specific to a Category of Service may be grouped into one or more Section Codes as well. Definition of Sections and Statement Presentation Codes in accordance with the present invention allow a service provider to group transactions by category, group some transactions by category and others in sections of blended or no categories, and group 'cross category' service packages in one section while grouping category specific transactions in their own sections.

Another feature of the present invention is the ability to produce summaries (e.g., by printing or displaying) of various services that a service provider may offer such as basic, non-basic, long distance, and calling card telephony services and basic, expanded basic, premium channel, and pay per view cable services. The Statement Presentation Codes of the present invention support the grouping and summarizing of the various services. Because of the flexibility in producing statements, a service provider may offer its customers the option of deciding which services are billed on a particular statement. Customers may choose to have all services billed on one statement or they may choose to have some services billed on one statement and other services billed on a different statement.

Another feature of the present invention is the ability to produce statement export files that may be used by a print vendor for printing and sending statements to a service provider's customers. In accordance with a preferred embodiment of the present invention a single, statement export file may be produced for telephone, cable, and data services or any combination of the services on one bill.

BRIEF DESCRIPTION OF THE DRAWING(S)

FIG. 1 is a block diagram of a statement presentation in accordance with a preferred embodiment of the present invention; and FIGS 2-32 are examples of screens in accordance with a preferred embodiment of the present invention.

DETAILED DESCRIPTION OF THE PREFERRED EMBODIMENT(S)

Referring to FIG. 1, the conceptual layout of a billing statement in accordance with a preferred embodiment of the present invention is shown. In accordance with the present invention, statement transactions are subdivided into several layers for presentation on a statement. The highest layer—

Layer 1 100—is divided into four segments: Summary 104, Itemization 108, Usage Detail 122, and Tax 136. These segments are subdivided into user-defined sections 106, 110, 112, 124, 126, 138 that make up the lower layers 102 of the statement presentation. The user-defined section for the Summary segment 104 is the Summary Line section 106. The user-defined section for the Itemization 108 and Usage Detail 122 segments is Occurrence Line 110, 112, 124, 126. Each Occurrence Line 110, 112, 124, 126 is further subdivided by Statement Presentation Codes 114, 116, 118, 120, 128, 130, 132, 134. The user-defined section for the Tax 136 segment is Tax Statement Line 138.

Preferably, the Statement Presentation Codes 114, 116, 118, 120, 128, 130, 132, 134 dictate how transactions are grouped and presented in each segment on the statement. Preferably, services, pay per view events, payments and adjustments, recurring service charges, one-time charges, usage, etc. are assigned a Statement Presentation Code. The attributes of Statement Presentation Codes include, among other things:

Section Code in which to print the Statement Presentation Code;

Summary Line to add the amount of the transactions to; and

Indication if the Statement Presentation Code should be sorted within the Service Occurrence.

Statement Presentation sections provide a means to group together Statement Presentation Codes. The codes allow transactions to be grouped by category of service, or combinations of categories. Certain transactions, such as payments, that are not specific to a category of service may be grouped into one or more section codes as well. Use and set up of Sections and Statement Presentation Codes allow a service provider to:

Group all transactions by category;

Group some transactions by category and others in sections of blended or no categories; and Group "cross category" service packages in one section, while grouping category specific transactions in their own sections.

Preferably, transactions may be separated by a Carrier Code. Services that can be processed for a carrier may refer to Statement Presentation Codes that in turn refer to one or more sections unique to the Carrier Code. Usage Attributes (including Statement Presentation Code) are defined by a carrier, so referring to Statement Presentation Codes unique to the Carrier is easy. Preferably, service codes are not defined by a carrier. Therefore, the set up and use of services unique to a Carrier may be dictated by operational methods and procedures.

A statement in accordance with the present invention may include two or more Occurrences (telephone lines or equipment outlets) that have services that refer to the same Statement Presentation Codes (e.g., recurring charges). In some instances, it may be desirable to present all transactions for each telephone line separately. The present invention accommodates this requirement by sorting/processing the transactions by occurrence (telephone line or equipment outlet), prior to sorting them by Statement Presentation Code. However, if some or all of the transactions for all telephone lines are to be combined and presented by Statement Presentation Code, the transactions may be sorted by Statement Presentation Code, and then by telephone line within the Statement Presentation Code. The present invention therefore, supports various methods of sorting. As a result of the flexibility in grouping services, a service provider may allow its customers to decide whether all services are billed on one statement or on multiple statements.

Statement Attribute

Statement Attribute Codes may be assigned to services, adjustment codes, and pay per view (PPV) events. The Statement Attribute Code defines what services are grouped together and in some cases, how the statement is paid. For example, each statement produced may have a statement attribute. If that statement attribute is assigned a method of payment of direct debit, then the amount of that statement may be automatically drafted. Referring to FIG. 2, the System Parameter Maintenance, Statement Presentation screen presents a service provider with options for defining statement attributes. At the screen in FIG. 2, the user may type '1' in the '?' column next to Statement Attributes and Press ENTER to begin the process of defining statement attributes.

Referring to FIG. 3, the Statement Attribute Code Maintenance screen presents a service provider with options for completing the process of defining statement attributes. The user may type '2' to change a statement attribute code, type '3' to copy a statement attribute code, or type '4' to delete a statement attribute code. The user also has the option of selecting F9 to add a new statement attribute code. Upon selecting F9, the user may be referred to the Statement Attribute Code Maintenance 1 screen in FIG. 4. Referring to FIG. 4, the user may type up to a 3-character code in the STATEMENT ATTRIBUTE CODE field and a description up to 35 characters in the STATEMENT ATTRIBUTE DESC field. Next, the user may type a value for the STATEMENT THRESHOLD NUMBER OF LINES field. This value is the maximum number of lines that will print per statement and per page. The user may type one of the following in the INCLUDE THE FOLLOWING IN LINE COUNT fields for Summary, Taxes, Itemization, Usage Detail, Billing Message, and Statement Text:

'Y' to include this particular statement component in the threshold number of lines count per statement and per page; or 'N' to not include this particular statement component in the threshold number of lines count per statement and per page.

Preferably, if Billing Message and Statement Text are not included in the number of lines count and a threshold determined at print time has already been reached, the billing messages and statement text are not printed on the statement. The user may type one of the following in the OUTPUT TAXES BY SERVICE CATEGORY field:

'Y' to print taxes for all services as individual line items on the statement; or 'N' to print taxes for all services as one line item on the statement.

The user may type one of the following in the INCLUDE MEMO ACCOUNTS field:

'Y' to produce a statement if the amount of the statement meets the requirements for sending a statement; or 'N' to indicate that a statement should not be sent, regardless of the A/R balance.

The user may type one of the following in the CHECK DIGIT ROUTINE field:

'A' for deviation of modulus 10; or

'X' for standard modulus 10.

The user may type one of the following in the LOCK BOX SCAN LINE ROUTINE field:

'A'=6-digit amount and 5-character company identifier;

'C'=7-digit amount and 4-character company identifier; or

'X'=7-digit amount and 5-character company identifier.

Preferably, the formats have the following characteristics.

TABLE 1

| A Format | C Format | X Format | All |
|---|---|---|---|
| Length | Length | Length | Format Fields |
| 5 | 4 | 5 | Company Identifier |
| 9 | 9 | 9 | Cust. Acct# |
| 1 | 1 | 1 | Acct# Check Digit |
| 1 | 1 | 1 | Amt Check Digit |
| 6 | 7 | 7 | Amount $s |
| Positions 2-29 within the Scan Line field. | Positions 3-30 within the Scan Line field. | Positions 1-29 within the Scan Line field. | |

The user may type a code in the PREVIOUS BALANCE STateMenT PRESENTATION CODE field. The user has the option of assigning a Statement Presentation Code to previous balances to indicate where the previous balance will be grouped and displayed on a statement. The user may type one of the following in the BUCKET NUMBER TO START FROM WHEN CALCULATING PAST DUE AMOUNT field:

TABLE 2

| '1' = Current | '3' = 31-60 | '5' = 91-120 |
|---|---|---|
| '2' = 01-30 | '4' = 61-90 | '6' = 121+ |

The amount owed in the bucket typed in this field is totaled with the Accounts Receivable (A/R) from subsequent buckets. This total is compared to an amount in the LATE FEE MINIMUM CHARGE field located on a Late Fee Scheme Maintenance screen. If the calculated total is greater, then the difference between the two amounts is displayed in the LATE BALANCE AMOUNT field in record type 'S' of a statement tape file.

Preferably, the user may page down to display additional screens. The following actions pertain to customers with a credit balance (or A/R balance<0). Referring to FIG. 5, the Statement Attribute Maintenance 2 screen provides additional options for defining statement attributes. The user may type one of the following in the PRINT IF THE CUSTOMER'S STATUS INDICATES TO PRINT A CREDIT BILL field:

'Y' to print a credit statement if the customer's status indicates that credit statements should be printed; or 'N' to not print a credit statement regardless of what the customer's status indicates for credit statements.

If 'Y' is answered to this statement, then a credit message may be typed on the message line in this category. If 'N' is answered, then the credit message field may be left blank. Next, the user may type one of the following in the PRINT A FINAL BILL REGARDLESS OF THE CUSTOMER'S STATUS field:

'Y' to print a final credit bill for a customer whose status indicates that credit balance statements should not be sent; or 'N' to use the customer's status code to indicate whether a credit balance statement should be sent.

If 'Y' is answered to this statement, then the user may type a message up to 37 characters in the credit MESSAGE field. For example, the message may read "Credit Balance—Do Not Pay." If 'N' is answered, then this field may be left blank.

The following actions pertain to customers with a debit balance (or A/R balance≧0). The user may type a dollar amount in the DO NOT PRINT STATEMENTS WITH A DEBIT BALANCE LESS THAN field. Customers with an A/R balance less than this amount but greater than zero, preferably, will not have statements produced unless they have other than normal transactions that indicate printing a statement. For example, this field may be set so that the system does not print statements for customers who owe between 0.00 and 5.00 dollars.

The user may type one of the following in the PRINT A FINAL BILL, REGARDLESS OF THE DEBIT BALANCE field:

'Y' to disregard debit restrictions set up previously and print a final debit balance statement; or 'N' to follow the requirements set up previously.

The following actions pertain to customers who do not meet the requirements set up previously to have a statement produced. Statements may be sent if other than normal transactions occurred. Other than normal transactions may include PPV charges, prorates from work order transactions, rate increases, and adjustment codes that may be flagged in other parts of the system as other than normal.

The user may type one of the following in the SHOULD BE PRODUCED FOR ALL CUSTOMERS field:

'Y' to produce a statement for all customers, regardless of balance, if they have an other than normal transaction; or 'N' to not produce a statement and follow the guidelines set forth previously.

For example, if debit bills are not printed unless the balance owed is greater than field5, then a customer who has a PPV transaction and owes a balance of field3 will have a statement produced if 'Y' is the response to the question. Preferably, if the response is 'N,' then a statement is not produced. If the same customer had a balance of field5.01, a statement is produced regardless of this field because debit balance statements are printed when greater than or equal to field5.

The user may type one of the following in the SHOULD BE PRODUCED FOR NON-MONTHLY BILL MODE CUSTOMERS ONLY field:

'Y' to produce a statement for non-monthly bill mode customers, regardless of balance, if they have an other than normal transaction; or 'N' to not produce a statement and follow the guidelines set forth in the earlier steps.

The user may type a message up to 52 characters in the MESSAGE field. The message prints on statements when other than normal transactions occur and when the flags set previously indicate to produce statements for these customers.

Preferably, the user may page down to display additional screens. Referring to FIG. 6, in the Statement Attribute Maintenance 3 screen, the user may type a message up to 35 characters in each of the PREVIOUS MONTH'S BALANCE fields for a message that is to display for the previous month's balance. For example, the FIRST STATEMENT might have "Starting Balance" or "Opening Balance." The message for SUBSEQUENT STATEMENTS might be "Previous Balance" or "Amount of Last Bill." The user may type a message up to 35 characters in the PAYMENTS fields. These messages describe the type of payment. The FULL PAYMENT field indicates a payment made in full. The message "Thank you for your prompt payment" may be used. The PARTIAL PAYMENT field indicates a partial payment. The message "Payment Received" may be used. The DEPOSIT PAYMENT field prints for payments applied toward deposits.

The user may type a description up to 35 characters in the SERVICES WITHOUT A DESCRIPTION field if a service without a description is encountered. The user may type up to 35 characters in the MERGED PRORATE DESCRIPTION fields. These messages describe the prorate. The FIRST STATEMENT field indicates prorated charges for the first statement a customer receives. The SUBSEQUENT STATEMENTS field indicates the prorate description that displays on any statements subsequent to the first statement in which prorates occur.

Preferably, the user may page down to display additional screens. Referring to FIG. 7, in the Statement Attribute Maintenance 4 screen, the user may type a message up to 60 characters in the MESSAGE TO PRINT IF STATEMENTS ARE SENT EACH MONTH field to cause statements to be produced for bank draft (direct debit) customers. This message displays between the standard billing message and the statement detail. The user may also leave this field blank so statements are not produced for bank draft (direct debit) customers. The user may type a message up to 60 characters in the PRE-NOTE STATUS field. If the method of payment is set up for a customer with the prenote flag set to 'Y,' the prenote message prints on the statement instead of the "Do Not Send Payment" message.

The user may type a message up to 60 characters in the MESSAGE TO PRINT IF STATEMENTS ARE NOT SENT MONTHLY AND AN OTHER THAN NORMAL TRANSACTION OCCURS field to produce a statement if an other-than-normal transaction occurs for bank draft (direct debit) customers. The user may also leave this field blank so a statement is not produced even if an other-than-normal transaction occurs for bank draft (direct debit) customers.

The user may type the maximum dollar amount a customer can be drafted in the MAXIMUM AMOUNT ALLOWED field. If a customer's balance exceeds this amount, then that customer is not drafted and a statement is sent containing the message that is specified for this condition. The user may type a message up to 60 characters in the MESSAGE TO PRINT IF MAXIMUM AMOUNT IS EXCEEDED field. The user may type the minimum dollar amount for which a customer can be drafted in the MINIMUM AMOUNT ALLOWED field. If a customer's balance is less than this amount, then that customer is not drafted and a statement is sent containing the message that is specified for this condition. The user may type the MESSAGE TO PRINT IF MINIMUM AMOUNT IS NOT MET. If the maximum or minimum conditions are met, preferably, a billing program prints a statement for the customer with the message indicated, regardless of the regular bank draft or change bank draft messages. Preferably, the maximum/minimum message prints in the same place as the standard bank draft message, between the standard billing message and the statement detail.

Statement Attribute Assignment

A statement attribute may be assigned to a service category and/or a combination of service categories. For example, a service category combination consisting of cable and telephone may be assigned to the same statement attribute so that they appear together on the same statement. The combinations may be comprised from the following service categories:

C=Cable
D=High Speed Data
L=Calling Cards
S=Special Circuits
T=Telephone

Referring to FIG. 8, the Statement Attribute Assignment Maintenance screens allows a service provider to assign service categories to statement attributes. The user may type a code in the STateMenT ATTRibute code field to assign to the Service Category Combo as listed.

Statement Presentation Code

A Statement Presentation Code may be assigned to services, adjustments, and PPV events to indicate where they should be grouped on a statement. The Statement Presentation Code may be up to 3 characters, including spaces. This code defines how information is displayed on the statement and a ledger. Referring to FIG. 9, the Statement Presentation Code Maintenance screen provides options for a service provider to define Statement Presentation Codes. Preferably, the user has the following options:

'2' to change a statement presentation code;
'3' to copy a statement presentation code;
'4' to delete a statement presentation code;
'P' to define paragraph details; and
'F9' to add a Statement Presentation Code.

If the user elects to add a code, the user may type a 3-character code in the PRESENTATION CODE field. Codes may be based on letters, digits, or a combination of letters and digits.

Referring to FIG. 10, the Statement Presentation Code screen provides options so a service provider can further define paragraph details for a statement. The user may type a message up to 60-characters for a HEADER. This header prints on the statement. The user may type a message up to 60-characters for a SUBTOTAL. This subtotal prints on the statement. The user may type a message up to 60-characters for a FOOTER. This footer prints on the statement.

The user may further specify a section code in the SECTION CODE field. The attributes defined for this Statement Presentation Code print in the section that is assigned using this field. The user may type a value for the SUMMARY LINE field. The user may further specify a sorting method by typing one of the following in the SORT WITHIN OCCURRENCE field:

'Y' to sort by occurrence; or
'N' to define what service category and sequence number to sort by.

To print all transactions for each occurrence separately on a statement, the user may type 'Y' to sort by occurrence. To print transactions for all occurrences combined, the user may type 'N' to override sorting by occurrence. If 'N' was typed, then the user may type the service category and sequence to sort by in the IF NO, SORT OCCURRENCE CTG/SEG# fields respectively.

Next, the user may type one of the following in the PRINT USAGE DETAIL FLAG field:

'Y' to print telephone usage details; or
'N' to not print telephone usage details.

The user may type one of the following in the DISCOUNT/RETAIL FOR USAGE field:

'D' to print the discounted rate for that service on the statement; or
'R' to print the retail rate for that service on the statement.

In the STateMenT PRESENTATION FOR PRORATES field, the user may type the Statement Presentation Code under which the prorates of the current presentation code may list. For example, six services in two different presentation codes may be prorated. The user may define both groups to point to Statement Presentation code 300 Prorated Programming. The description associated with presentation code 300 displays on the statement and ledger. The user may type a font code to assign to the HEADER portion of the statement, the DETAIL portion of the statement, and the FOOTER portion of the statement. The user may specify the offset number of spaces from the left to apply to DESCRIPTIONS. This value defines the indenting to be used to print descriptions on the statement. The user may specify the number of lines to skip BEFORE HEADER and the offset number of spaces from the right to apply to AMOUNTS. This value defines the indenting to be used to print amounts on the statement. Finally, the user may type the number of lines to skip AFTER FOOTER.

Paragraph Display

Referring to FIG. 11, the Statement Presentation Code Maintenance 1 screen provides options for defining and maintaining Statement Presentation Codes. First, the user may type a description up to 32-characters for a PRESENTATION DESCRIPTION. Next, the user may type one of the following in the BILLING DESCRIPTIONS TO USE ON THE BILLS AND LEDGER field:

'M'atrix—the matrix description prints;

'P'aragraph—the 3-character rate master description prints between an intro and exit line;

'R'—the long rate master description prints between an intro and exit line;

'S'ervice—the long rate master description prints for each service. There are no intro or exit lines;

'Q'—the 10-character rate master description prints between an intro and exit line; or 'G'—all items in this group will be summarized in one line item using the Presentation Description.

According to the billing description chosen, the following tables indicate what displays on the statement and ledger.

Statements, preferably, have the following information.

TABLE 3

| Bill Description | Fields Used to Display on Bill | EXAMPLE |
|---|---|---|
| G-Grouping | All items in that group are added into one line item and print the 'Presentation Description' defined on the statement and ledger. | Basic Services $26.50<br>Pay Service $18.00<br>NOTE: All basic services are grouped together and all pay services are grouped together. |
| M-Matrix | The 3-line BILLING DESCRIPTION from the Matrix Master. | Two Pay Package. A monthly cable savings of $2.90. |
| P-Paragraph | The 3 CHAR description from the Rate Master for all services in the group prints between the intro and exit lines. | Monthly service:<br>BAS, HBO, SHO<br>We hope you enjoy your service. |
| S-Service | The SERVICE NAME description from the Rate Master. Individual rates are displayed next to each service. | Basic $19.95<br>HBO $9.50<br>Showtime 9.50 |
| Q-Method | The SHORT NAME description from the Rate Master for all services in the group prints between the intro and exit lines. | Monthly service: $32.95<br>Basic, HBO, Showtime<br>We hope you enjoy your service. |
| R-Method | The SERVICE NAME description from the Rate Master and any auxiliaries coded to merge their descriptions print between the intro and/or exit lines, one service per line. Three discount summary lines print if discounts apply; one alternate summary line prints if no discounting applies. | Your Monthly service includes:<br>Basic<br>HBO<br>Showtime<br>List Price of Services<br>Package Discount<br>You Pay Only<br>Your Monthly service includes:<br>Basic<br>HBO<br>Showtime<br>Total Price |

The Ledger Display preferably has the following information.

TABLE 4

| Bill Description | Fields Used to Display on Ledger | EXAMPLE |
|---|---|---|
| G-Grouping | All items in that group are added into one line item and print the 'Presentation Description' defined on the ledger. | Basic Services $26.50<br>Pay Service $18.00<br>NOTE: All basic services are grouped together and all pay services are grouped together. |
| M-Matrix | First line of the BILLING DESCRIPTION from the Matrix Master. | Two Pay Package<br>or<br>Monthly Service |
| P-Paragraph | First line of the BILLING DESCRIPTION from the Matrix Master. | Two Pay Package<br>or<br>Monthly Service |
| S-Service | First line of the SERVICE NAME description from the Rate Master. Individual rates are displayed next to each service. | Basic $19.95<br>HBO $9.50<br>Showtime $9.50 |
| Q-Method | The PRESENTATION CODE description to display in the ledger unless an 'M' is typed in position 50 of the '98 · BILL' Control File. In that case, the 1st line of the BILLING DESCRIPTION from the Matrix Master displays. | Two Pay Package<br>or<br>Monthly Service |
| R-Method | The PRESENTATION CODE description to display in the ledger unless an 'M' is typed in position 50 of the '98 · BILL' Control File. In that case, the 1st line of the BILLING DESCRIPTION from the Matrix Master displays. | Two Pay Package<br>or<br>Monthly Service |

Next, the user may specify one of the following in the PRINT ZERO RATED PRIMARY SERVICES field:
  'Y' to print the primary service selected even if it has a zero rate; or
  'N' not to print the primary service if it has a zero rate.

The user may type one of the following in the ITEMIZE ADDITIONAL OUTLET CHARGES? field:
  'Y' to itemize the additional outlet charges. The statement indicates the charge for additional outlets and the number of additional outlets; or
  'N' not to itemize the additional outlet charges.

If 'Y' was typed, then the following fields are completed:
  The user may type one of the following in the PRINT ZERO RATED ADDITIONAL OUTLET COUNTS field:
    'Y' to itemize the additional outlets even if they are free; or
    'N' to not print the number of additional outlets at a free rate.
  The user may type one of the following in the PRINT ADDITIONAL RATES FOR SERVICES field:
    'Y' to include additional outlet rates for premium services; or
    'N' to not print additional outlet rates for premium services.

For example, if the flag in the PRINT ADDITIONAL RATES FOR SERVICES is 'Y,' then the following type of description prints:
  Your Monthly Service Includes:
  Basic@11.73 1 Additional@2.00

CPS@10.77 1 Additional@2.00
Enjoy Your Service
Total 26.50

If the flag in PRINT ADDITIONAL RATES FOR SERVICES is 'N,' then the following type of description prints:
Your Monthly Service Includes:
Basic@11.73 1 CPS@10.77
Enjoy Your Service
Total 26.50

Preferably, if this flag is 'N' and the customer has additional occurrences of services, then the service dollars listed in the paragraph will not add up to the total as additional occurrences are not listed.

The user may specify one of the following in the INCLUDE A LA CARTE RATES IN THE PARAGRAPH field:
'Y' to print the rates from the rate master for the service; or
'N' to not print the rates from the rate master.

If 'Y' was typed, then the user may type a character in an INSERTION CHARACTER TO USE TO JOIN THE RATE TO THE SHORT DESCRIPTION field. For example, '@' may be used.

The user may type one of the following in the PRINT SUMMARY LINES AFTER THE PARAGRAPH EXIT LINE? field:
'Y' to print the summary lines typed for this group after the exit line; or
'N' to not print the summary lines for this group after the exit line.

Preferably, the user may page down to display additional screens. Referring to FIG. 12, the Statement Presentation Code Maintenance screen 2 provides a service provider with additional options for defining and maintaining Statement Presentation Codes. The user may type a value the NUMBER OF MATRIX DESCRIPTION LINES TO PRINT field. The matrix description is a maximum of 3 lines. The user may type a description up to 35 characters in the INTRO LINE field to print as an introduction line to the services listing. The user may type a description up to 35 characters in the EXIT LINE field to print as the exit line to the services listing. The user may type a value in the SUMMARY LINES TO PRINT AFTER THE PARAGRAPH EXIT LINE field. The user may type a description up to 35 characters to describe the total of service a la carte pricing. For example, the description may be "List Price of Services." The user may type a description up to 35 characters to describe the discount the customer is receiving because of packaging. For example, the description may be "Discount." The user may type a description up to 35 characters to describe the amount charged for the services listed in the paragraph. For example, the description may be "You Pay Only" or "Net Price." The user may type a description up to 35 characters in the ALTERNATE SUMMARY LINE IF NO APPLICABLE DISCOUNT field. This summary line prints instead of the 3 summary lines if there is no discount. The alternate description in this field is shown instead. For example, the alternate description may be Total Price.

Preferably, the user may page down to display additional screens. Referring to FIG. 13, the Statement Presentation Code Maintenance 3 screen provides a service provider with additional options for defining and maintaining Statement Presentation Codes. For ADDITIONAL OUTLET DESCRIPTIONS FOR PREMIUM SERVICES, the user may type a description up to 10 characters in the PARAGRAPH field to print within the paragraph for the premium additional description. For example, the description may be "ADDTL @." The user may type a description up to 20 characters in the DETAIL field to print for additional premium services outside the paragraph. For example, the description may be "ADDITIONAL OUTLETS @." For ADDITIONAL OUTLET DESCRIPTIONS FOR AUXILIARY SERVICES, the user may type a description up to 10 characters in the PARAGRAPH field to print within the paragraph for the auxiliary additional description. For example, the description may be "ADDTL @." The user may type a description up to 20 characters in the DETAIL field to print for additional premium services outside the paragraph. For example, the description may be "ADDITIONAL OUTLETS @."

Statement Font Codes

As a reference for print vendors that print billing statements, font codes may be set up and assigned to Statement Section Codes and Statement Occurrence Lines so the print vendor knows what font attributes to apply to those areas of the statement. For example, Section Code 101 may be used for defining how telephone services print on a statement. To print with bold and italics font attributes, the font code BI may be assigned to bold and italics in the font code description. After supplying the print vendor with a cross-referenced list of the font codes and their definitions, whenever the print vendor encounters the BI font code, the bold and italic font attributes are applied to that section.

Referring to FIG. 14, the Statement Font Code Maintenance screen provides options for defining and maintaining font codes. Preferably, the following options are available. The user may type '4' to delete a statement presentation code and press [F9] to add a new Statement Presentation Code. First, the user may type a 2-character FONT CODE and up to 32-characters for a DESCRIPTION.

Statement Occurrence Line

Referring to FIGS. 15 and 16, the Statement Occurrence Line Maintenance and Statement Presentation Occurrence screens provide options for defining and maintaining occurrence lines. Each occurrence corresponds to a telephone line or an equipment outlet. As shown in FIG. 15, the service categories may include Cable Bill, High Speed Data User, Calling Card, Circuit ID, and Phone Bill. Additional service categories may be defined. The user may select a service category from the screen in FIG. 15 or the user may add a new service category by entering a code in the SERVICE CATEGORY CODE field as shown in FIG. 16.

Referring to FIG. 17, the Statement Presentation Occurrence screen provides further options for defining and maintaining each occurrence. First, the user may type a description up to 60-characters for a HEADER field. This header prints in the itemization segment of the statement. The user may type a description up to 60-characters for a SUBTOTAL. This subtotal prints in the itemization segment of the statement. The user may type a description up to 60-characters for a FOOTER. This footer prints in the itemization segment of the statement. The user may type a description up to 60-characters for a HEADER. This header prints in the usage detail segment of the statement. The user may type a description up to 60-characters for a SUBTOTAL. This subtotal prints in the usage detail segment of the statement. The user may type a value up to 60-characters for a FOOTER. This footer prints in the usage detail segment of the statement. The user may type a font code to assign to the HEADER portion of the statement and the FOOTER portion of the statement. The user may type the offset number of spaces from the left to apply to DESCRIPTIONS. This value defines the indenting used to print descriptions on the statement. The user may type a value for the number of lines to skip BEFORE HEADER. The user may type the offset number of spaces from the right to apply to AMOUNTS. This value defines the indenting used to print amounts on the statement. The user may type a value for the number of lines to skip AFTER FOOTER.

Statement Section Codes

Referring to FIG. 18 and FIG. 19, the Statement Section and Statement Presentation Section screens provide options for defining and maintaining Statement Sections. First, the user may select a 3-digit SECTION CODE from the screen in FIG. 18. The user may also choose to add a new SECTION CODE by selecting the add option of the screen in FIG. 18 and entering a new code in the SECTION CODE field of the screen in FIG. 19.

Referring to FIG. 20, the Statement Presentation Section screen provides options for defining and maintaining presentation information for a Section Code. First, user may type a description up to 60-characters for a HEADER. The user may type a description up to 60-characters for a SUBTOTAL. The user may type a description up to 60-characters for a FOOTER. The user may type a font code to assign to the HEADER portion of the statement and a font code to assign to the FOOTER portion of the statement. The user may type the offset number of spaces from left to apply to DESCRIPTIONS. This value defines the indenting used to print descriptions on the statement. The user may type the number of lines to skip in the BEFORE HEADER field. The user may type the offset number of spaces from the right to apply to AMOUNTS. This value defines the indenting used to print amounts on the statement. The user may type the number of lines to skip in the AFTER FOOTER field.

Statement Summary Line

Referring to FIG. 21 and 22, The Statement Summary Lines screens provide options for defining and maintaining Summary Lines. The user may select a Summary Line or define a new one. After selecting F9=Add from the screen in FIG. 21, the user proceeds to FIG. 22. Referring to FIG. 22, first, the user may type a 3-digit code in the SUMmary LINE code field. The user may type a description up to 60-characters in the DESCRIPTION field.

Customer Method of Payment Codes

Customer Method of Payment (MOP) codes specify the types of methods of payment that can be used. Depending on the payment method, this option determines if it is allowed in Counter Cash, if a check number is required, the length of an account number, etc. Referring to FIG. 23, the Method of Payment Maintenance screen provides options for defining and maintaining payment methods for customers. Preferably, the available options are:
  '2' to change a method of payment code;
  '3' to copy a method of payment code;
  '4' to delete a method of payment code; and
  [F9] to add a new method of payment code.

If the user elects to add a new method of payment code, FIG. 24, the Customer Method of Payment Maintenance screen provides options for defining a new method. Referring to FIG. 24, the user may type a 3-digit code in the CUSTOMER METHOD OF PAYMENT CODE field. The user may type up to 35 characters for the DESCRIPTION field. The user may type a code in the PAYMENT CODE CATEGORY field. The user may type a code for the MOP PROCESSING VENDOR field. The METHOD OF PAYMENT ACCounT NumBeR REQUIRED inquiry field indicates *Yes if the MOP account number is required and *No if it is not required. Typically, it is required for direct debits and credit cards and is not required for cash, checks, money orders, and gift certificates. The user may type a value for the METHOD OF PAYMENT ACCounT NumBeR VALIDATION field to be used to determine the method used to verify the account number is valid. Preferably, the validation method entered here is used in the Customer Method of Payments screen to validate the account number entered. For example, a Visa credit card number starts with a '4,' Master Card starts with a '5,' and an American Express number starts with a '3'. The system also uses either Modulus 10 or 11, depending on the credit card type, to check the entire account number. The user may type a value for the METHOD OF PAYMENT ACCounT MAXIMUM LENGTH field. The account length is used to verify that the account number entered in the Customer Method of Payments screen has the correct number of digits. In the OPeRator field, the user may type one of the following to apply to the number type in the MAXIMUM LENGTH field.
  'EQ'=equal to;
  'LT'=less than; or
  'LE'=less than or equal to.

The user may type a value in the METHOD OF PAYMENT ACCounT MINIMUM LENGTH field. This value is the minimum number of digits the account number occupies. In the OPeRator field, the user may type one of the following to apply to the number typed in the MINIMUM LENGTH field:
  'GT'=greater than; or
  'GE'=greater than or equal to.

Next, the user enters a value for the DEFAULT STateMenT PReSeNtation Code field. The user may type one of the following in the COUNTER CASH ALLOWED field:
  'Y' to allow this method of payment to be used in Counter Cash; or
  'N' to not allow this MOP to be used in Counter Cash. If set to 'N,' this MOP code does not display in Counter Cash.

The user may type one of the following in the CHECK NUMBER REQUIRED field:
  'Y' to require a check number while in Counter Cash when using this MOP; or
  'N' to not require a check number while in Counter Cash.

The user may type one of the following in the TRACK HISTORY field:
  'Y' to track the history of MOP payments; or
  'N' to not track the history of MOP payments.

The user may type one of the following in the PRENOTE REQUIRED field:
  'Y' to create a prenote when this MOP code is assigned; or
  'N' to not create a prenote for this MOP code.

Maintain Statement Presentation Codes for MOP

Referring to FIG. 25, the Maintain Statement Prsn Code for MOP screen provides options for controlling how split payments are printed on a statement. Preferably, if the default Statement Presentation Code is overridden for a Customer Method of Payment Code and if a different Statement Presentation Code is defined for each service category, a payment that is to be split among two or more different service categories prints as separate line items on the statement. If each service category points to the same Statement Presentation code, the split payment appears as one line item on the statement. For example, John Doe's statement balance, which includes both Cable and Telephone, is field100. Fifty dollars (field50) of the statement is for Cable service and the remaining field50 is for Telephone service. John Doe sends in one payment for field100. Two payments of field50 each (one for Cable and one for Telephone) may be printed on the statement or one payment of field100 may be printed on the statement. Preferably, the user has the option of pressing [F9] to assign a Statement Presentation Code to a service category/Accounts Receivable (AR) code. Referring to FIG. 25, the user may type a code in the SeRVice CaTeGory field or may add a new code by selecting F9. Preferably, the AR Code assigned to the service category entered automatically displays in the AR CODE field. Next, the user may type a Statement Presentation Code in the STateMenT PReSeNtation CODE field.

Usage Attributes

The present invention supports the grouping of transactions with Statement Presentation Codes. Accordingly, it supports the grouping of call summary with Statement Presentation Codes defined by a Plan ID and by Usage. Referring to FIG. 26, the Usage Type Maintenance screen provides options for defining and maintaining usage types. The user may type a code in the Usage Types field of the screen in FIG. 26.

Usage Types

Usage Types define the types of usage that are supported (e.g., Intrastate or Interstate Calling Cards, Local Operator Collect calls, etc.) This option may be used to maintain usage types and their carrier attributes. Referring to FIG. 27, the Usage Type Maintenance screen provides options for a defining and maintaining usage types. The user may modify values for an existing usage type or may add a new usage type. Preferably, the user may select [F9] from the screen in FIG. 26 to add a usage type. Referring to FIG. 27, the user may type a 5-character code USAGE TYPE field to add a new usage type. Referring to FIG. 29, the Usage Type Maintenance screen may be used to further define usage types. The user may type a description of the usage up to 35 characters in the DESCRIPTION field. The user may type a code in the AR CODE field. The user may type a code in the STATEMENT PRESENTATION CODE field. The user may type a code in the TAX GROUP CODE field. The user may type general ledger number to assign to the Usage in the G/L MINOR NumBeR field. The user may type a code in the STateMenT RATE CODE field.

Usage Plans

Usage Plans define the plans to include on the billing statement. For example, Local Direct Dial call may be used, and if defined as a Usage Plan, it is displayed on the bill. This option may be used to maintain these usage plans and their carrier overrides. Referring to FIG. 29, the Usage Plan Maintenance screen preferably, has the option [F9] to add a Usage Plan or an existing Usage Plan may be modified. Referring to FIG. 30, the Usage Plan Maintenance screen, preferably, has options as follows:

'C' to maintain carrier overrides; or

'4' to delete usage plans; and

[F9] to change plans.

The user may type a value up to 6 characters in the PLAN ID field. The user may type a description up to 35 characters in the PLAN DESCRIPTION field. The user may type a code in the STateMent PReSentation field and the user may type a value in the StateMent INDicator field. As explained earlier, the Statement Indicator indicates whether the Statement Presentation Code should be sorted within the Service Occurrence.

Usage Plan-Carrier Override

Usage Plan-Carrier Overrides are used to override the carrier's presentation code. Referring to FIG. 31, preferably, the Usage Plan-Carrier Override screen has the option F9 available to add an override or an existing Usage Plan may be modified. Referring to FIG. 32, the Usage Plan-Carrier Override screen provides additional options for defining Statement Presentation Codes to override the carrier's presentation code. The user may type an identifier in the CARRIER ID field. The user may type a code in the STateMent PRESentation code field. If the user selects F9 to add a new code, FIG. 32, the Usage Plan-Carrier Override screen provides additional options.

Multiple Accounts Receivable (A/R)/Multiple Statements

The present invention supports multiple accounts receivable (A/R) and multiple statements. Customers who subscribe to more than one service category (i.e., cable, high-speed data, and telephone), preferably, have separate A/R records so that information regarding each service category may be tracked. Their accounts receivable aging is tracked for each A/R code/Service Category. Furthermore, one or more statements may be generated for a customer depending on the customer's preference. The ability to generate one statement for customers who subscribe to more than one service represents a significant improvement over the prior art.

Multiple A/R

The present invention tracks accounts receivable aging at the customer/service category/AR code level. Any service category may point to one or more A/R's. Preferably, service categories are defined at the system level. Preferably, AR Codes are user-defined. A service definition preferably includes the service category.

Multiple Statements

With the present invention, an option is available to put cable, data, and telephone services on the same statement, or separate statements, or any combination of services on one or more statements. Statements are defined at the occurrence level, therefore, any service may be billed on more than one statement.

Statement Codes

Preferably, service categories are assigned default statement codes. These statement codes define whether multiple statements or just a single, converged statement is printed for a customer. Service categories that are assigned the same statement code print on the same statement. For example, if cable and telephone services have the same statement code of 1, then a customer who has both cable and telephone services on his or her account will have one statement. If cable service has a statement code of 1 assigned to it and telephone service has statement code of 2 assigned to it, then a customer who has both cable and telephone services will have two statements.

The number of statements a customer has may be changed by overriding the statement code default assigned to a service category. For example, Sunshine Cable may have its service categories set so all categories print on one statement. However, a customer of Sunshine Cable may decide he or she wants cable and telephone services on separate statements. Using Customer Statement Configuration options, it is possible to add a statement to the customer's account and move either the cable or telephone service category to the new statement, therefore, creating a second statement that the customer will receive; one for cable and one for telephone.

Statement Attribute Codes

A Statement Attribute Code, preferably, has a different combination of services assigned for different customers. The attributes of each statement are defined by the Statement Attribute Code. These attributes include statement messages and the number of lines on a statement. After the Statement Attribute Codes are defined as described above, the service category or combination of service categories that will be using those statement attributes on a particular statement may be assigned.

Each statement may have one or more A/R codes assigned to it depending on the services that are billed on the statement. A/R codes allow tracking of outstanding accounts receivable, aging balances, and write-offs. For example, Sunshine Cable may have its cable, high-Speed data, and telephone services billed together on customer statements. If Sunshine Cable wants to track how much of its total accounts receivable and write-offs are generated by different groupings of services, it may establish separate A/R codes for each grouping as explained above. The parameters of an A/R Code indicate late fee charges, multiple service providers, and insufficient funds charge amounts.

After defining the A/R Code, a Service Category may be linked to that A/R Code. This link or association defines the valid combinations of service category and A/R code that may be used. The same service category may be used with several A/R Codes and likewise, the same A/R Code may be used with several service categories. For example, the calling card, special circuit, and telephony Service Categories may all be used with A/R Codes such as Regulated Service and Unregulated Service. Other parameters defined for A/R codes are the PAYMENT PRIORITY and PAYMENT PROCESS TYPE in A/R Service Categories. The PAYMENT PRIORITY, PAYMENT PROCESS TYPE, and MATCH BALANCE fields are used together to determine how the present invention applies payments to a customer's account. Preferably, this procedure is followed any time a payment is processed that is not assigned to a specific A/R Code.

In a preferred embodiment of the present invention, processing works as follows. The customer's statement is examined to see if only one A/R exists. If so, the payment applies to that A/R. If more than one A/R exists and the MATCH BALANCE field is 'Y,' then the customer's statement is checked to see if the amount of the payment matches the balance of either A/R. If so, the payment applies to the A/R with the matched balance. If they both have the same balance, then it is the A/R with the higher priority. If the MATCH BALANCE field is 'N' or the payment does not match either A/R balance, then A/R PAYMENT PRIORITY is considered. The process identifies the PAYMENT PROCESS TYPE identified in the A/R with the highest priority (lowest number value) and uses that to identify how the payment is processed. If PAYMENT PROCESS TYPE='R,' then the payment is applied to that A/R and any overpayment is carried forward to the next A/R according to priority. If overpayment is carried forward, payment processing follows the rule of the next A/R in priority. If PAYMENT PROCESS TYPE='G,' then the payment is applied to the oldest aging bucket of the A/R with the highest priority. It then applies the payment to the same aging bucket in the next A/R by priority.

For example, a customer has the following A/R:

TABLE 5

| A/R | 1-30 | 31-60 | 61-90 | PTY | PRC |
|-----|------|-------|-------|-----|-----|
| 1 | 10.00 | 10.00 | 10.00 | 3 | G |
| 2 | 15.00 | | | 1 | R |
| 3 | 8.00 | 8.00 | 8.00 | 2 | G |

The customer makes a payment of field40. The following A/R results.

TABLE 6

| A/R | 1-30 | 31-60 | 61-90 | PTY | PRC |
|-----|------|-------|-------|-----|-----|
| 1 | 10.00 | 10.00 | | 3 | G |
| 2 | | | | 1 | R |
| 3 | 8.00 | 1.00 | | 2 | G |

The present invention facilitates the production of billing statements for telephone, cable, and data services by supporting the collating, grouping, summarizing, and describing of transactions for a statement. The present invention provides a conceptual layout of a statement that provides a service provider with flexibility in producing statements for its customers. A service provider may group, summarize, and order like statement transactions for a particular service category (e.g., telephone service, cable service, and data service) so that a customer has the option of receiving one or more statements, based on his or her preference, for each service used. Although the present invention has been described in accordance with a preferred embodiment, it is understood that many modifications to the present invention may be made without departing from the scope of the present invention.

What is claimed is:

1. A method in a computer system for providing a customer billing statement for a plurality of different communications services, the method comprising the steps of:
   (a) using a computer system to perform an act of formatting a customer billing statement to create a formatted billing statement form, the act of formatting consisting of comprising the steps of:
      (i) creating a plurality of statement presentation codes, each statement presentation code comprising one or more attributes for dictating the presentation of transaction information on a customer billing statement, wherein said attributes comprise:
         (1) a section code,
         (2) a summary line,
         (3) a sorting indication, and
         (4) a statement presentation section,
      (ii) creating a plurality of user-selected sections, each section having at least one of said statement presentation codes being selected by a user,
      (iii) creating a plurality of segments, each segment having at least one of said sections,
      (iv) assigning at least one statement presentation code from said plurality of statement presentation codes to at least one section from said plurality of sections, and
      (v) assigning at least one section from said plurality of sections to each one of said plurality of segments;
   (b) entering billing information relating to a plurality of communications services provided to a customer into said formatted billing statement form in accordance with said segments, said sections, and said statement presentation codes to create a completed billing statement;
   (c) providing said completed billing statement to said customer; and
   (d) allowing a provider of said plurality of communications services to determine a format for customer billing statements relating to said plurality of communications services provided by said communications service provider, wherein the formatting is conducted in accordance with said format.

2. The method of claim 1, wherein the step of creating a plurality of segments consists comprises the steps of:
   (1) creating a summary segment,
   (2) creating an itemization segment,
   (3) creating a usage detail segment, and
   (4) creating a tax segment.

3. The method of claim 2, wherein the step of creating a plurality of sections comprises the steps of:
   (1) creating a summary line section for said summary segment,
   (2) creating a plurality of occurrence line sections for said itemization and usage detail segments, and
   (3) creating a tax line segment for said tax segment.

4. The method of claim 3, further comprising the step of assigning occurrences to said occurrence line sections in said itemization and said usage details segments.

5. The method of claim 4, wherein the step of assigning occurrences consists of comprises assigning at least one equipment outlet to at least one of said occurrence line sections.

6. The method of claim 1, further consisting of comprising grouping and presenting information relating to transactions relating to at least two communications services of said plurality of services in one or more segments on the statement.

7. The method of claim 6, wherein the step of grouping and presenting is completed in accordance with said statement presentation codes.

8. The method of claim 1, wherein the plurality of communications services includes at least two of cable, telephony, video, or data services.

9. The method of claim 1, further comprising the steps of:
   (e) grouping together information relating to a plurality of communications services into at least one of said segments or at least one of said sections, and
   (f) assigning a statement attribute code to each communications service to represent how said information is to be grouped together.

10. The method of claim 1, further comprising the steps of:
    (e) allowing said customer to determine a method of payment for charges relating to each communications service; and
    (f) assigning a method of payment code to each communications service to represent the method of payment determined by said customer.

11. A system operable to carry out the steps comprising the method of claim 1.

12. A computer readable medium comprising instructions to perform the method of claim 1.

13. A method in a computer system for providing a customer billing statement for a plurality of different communications services, the method comprising the steps of:
    (a) using a computer system to perform an act of formatting a customer billing statement to create a formatted billing statement form, the step of formatting comprising the steps of:
       (i) creating a plurality of statement presentation codes, each statement presentation code comprising one or more attributes for dictating the presentation of transaction information on a customer billing statement,
       (ii) creating a plurality of user-selected sections, each section having at least one of said statement presentation codes being selected by a user,
       (iii) creating a plurality of segments, each segment having at least one of said sections, wherein the step of creating a plurality of segments comprises the steps of:
          (1) creating a summary segment,
          (2) creating an itemization segment,
          (3) creating a usage detail segment, and
          (4) creating a tax segment,
       (iv) assigning at least one statement presentation code from said plurality of statement presentation codes to at least one section from said plurality of sections, and
       (v) assigning at least one section from said plurality of sections to each one of said plurality of segments;
    (b) receiving input representing a preference of a customer for separate billing statements, wherein each of said separate billing statements relates to one or more different communications services provided to said customer,
    (c) entering billing information relating to a plurality of services provided to said customer into said formatted billing statement form in accordance with said segments, said sections, said statement presentation codes, and said input to create one or more completed billing statements;
    (d) providing said one or more completed billing statements to said customer; and
    (d) allowing a provider of said plurality of communications services to determine a format for customer billing statements relating to said plurality of communications services provided by said communications service provider, wherein the formatting is conducted in accordance with said format.

14. The method of claim 13, further comprising the step of assigning a statement code to each of said communications services to correspond to said input.

15. The method of claim 13, wherein said attributes comprise:
    (1) a section code,
    (2) a summary line,
    (3) a sorting indication; and
    (4) a statement presentation section.

16. The method of claim 13, wherein the step of creating a plurality of sections comprises the steps of:
    (1) creating a summary line section for said summary segment,
    (2) creating a plurality of occurrence line sections for said itemization and usage detail segments, and
    (3) creating a tax line segment for said tax segment.

17. The method of claim 16, further comprising the step of assigning occurrences to said occurrence line sections in said itemization and said usage details segments.

18. The method of claim 17, wherein the step of assigning occurrences comprises assigning at least one equipment outlet to at least one of said occurrence line sections.

19. The method of claim 13, wherein the plurality of communications services includes at least two of cable, telephony, video, or data services.

20. The method of claim 13, further comprising the steps of:
    (f) grouping together information relating to a plurality of communications services into at least one of said segments or at least one of said sections, and
    (g) assigning a statement attribute code to each communications service to represent how said information is to be grouped together.

21. The method of claim 13, further comprising the steps of:
    (f) allowing said customer to determine a method of payment for charges relating to each communications service; and
    g) assigning a method of payment code to each communications service to represent the method of payment determined by said customer.

22. A system operable to carry out the steps comprising the method of claim 13.

23. A computer readable medium comprising instructions to perform the method of claim 13.

24. A method for providing a customer billing statement for a plurality of different communications services, the method comprising the steps of:
- (a) using a computer system to perform an act of formatting a customer billing statement to create a formatted billing statement form, the step of formatting comprising the steps of:
  - (i) creating a plurality of statement presentation codes, each statement presentation code comprising one or more attributes for dictating the presentation of transaction information on a customer billing statement,
  - (ii) creating a plurality of user-selected sections, each section having at least one of said statement presentation codes being selected by a user,
  - (iii) creating a plurality of segments, each segment having at least one of said sections,
  - (iv) assigning at least one statement presentation code from said plurality of statement presentation codes to at least one section from said plurality of sections,
  - (v) assigning at least one section from said plurality of sections to each one of said plurality of segments; and
- (b) entering billing information relating to a plurality of communications services provided to a customer into said formatted billing statement form in accordance with said segments, said sections, and said statement presentation codes to create one or more statement export files;
- (c) providing said one or more statement export files to a print vendor for printing one or more completed billing statements;
- (d) allowing a provider of said plurality of communications services to determine a format for customer billing statements relating to said plurality of communications services provided by said communications service provider, wherein the formatting is conducted in accordance with said format;
- (e) grouping together information relating to a plurality of communications services into at least one of said segments or at least one of said sections; and
- (f) assigning a statement attribute code to each communications service to represent how said information is to be grouped together.

25. The method of claim 24, wherein said attributes consist of comprise:
- (1) a section code,
- (2) a summary line,
- (3) a sorting indication, and
- (4) a statement presentation section.

26. The method of claim 24, wherein the step of creating a plurality of segments comprises the steps of:
- (1) creating a summary segment,
- (2) creating an itemization segment,
- (3) creating a usage detail segment, and
- (4) creating a tax segment.

27. The method of claim 26, wherein the step of creating a plurality of sections comprises the steps of:
- (1) creating a summary line section for said summary segment,
- (2) creating a plurality of occurrence line sections for said itemization and usage detail segments, and
- (3) creating a tax line segment for said tax segment.

28. The method of claim 27, further comprising the step of assigning occurrences to said occurrence line sections in said itemization and said usage details segments.

29. The method of claim 28, wherein the steps of assigning occurrences comprises assigning at least one equipment outlet to at least one of said occurrence line sections.

30. The method of claim 24, wherein the step of grouping and presenting is completed in accordance with said statement presentation codes.

31. The method of claim 24, wherein the plurality of communications services includes at least two of cable, telephony, video, or data services.

32. The method of claim 24, further consisting of comprising the steps of:
- (g) allowing said customer to determine a method of payment for charges relating to each communications service; and
- (h) assigning a method of payment code to each communications service to represent the method of payment determined by said customer.

33. A system operable to carry out the steps comprising the method of claim 24.

34. A computer readable medium comprising instructions to perform the method of claim 24.

* * * * *

UNITED STATES PATENT AND TRADEMARK OFFICE
CERTIFICATE OF CORRECTION

PATENT NO. : 7,509,281 B1 Page 1 of 1
APPLICATION NO. : 09/709993
DATED : March 24, 2009
INVENTOR(S) : Matthew Brown and Marc Jazvac It is certified that error appears in the above-identified patent and that said Letters Patent is hereby corrected as shown below:

Column 6, line 31 "field5" should be changed to --$5--;
Column 6, line 32 "field3" should be changed to --$3--;
Column 6, line 35 field5.01" should be changed to --$5.01--;
Column 6, line 37 "field5" should be changed to --$5--;
Column 14, line 64 "field100" should be changed to --$100--;
Column 14, line 65 "field50" should be changed to --$50--;
Column 14, line 66 "field50" should be changed to --$50--;
Column 14, line 67 "field100" should be changed to --$100--;
Column 14, line 67 "field50" should be changed to --$50--;
Column 15, line 2 "field100" should be changed to --$100--;
Column 17, between lines 6 and 7, the heading --A/R Codes-- should be added;
Column 18, line 1 "field40" should be changed to --$40--;
Claim 1, line 33 "consisting of" should be deleted;
Claim 2, line 2 "consists" should be deleted;
Claim 5, line 17 "consists of" should be deleted;
Claim 6, line 20 "consisting of" should be deleted;
Claim 25, lines 1-2 "consist of" should be deleted;
Claim 32, line 32 "consisting of" should be deleted.

Signed and Sealed this

Nineteenth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,509,281 B1
APPLICATION NO. : 09/709993
DATED                 : March 24, 2009
INVENTOR(S)       : Matthew Brown and Marc Jazvac It is certified that error appears in the above-identified patent and that said Letters Patent is hereby corrected as shown below:

Column 6, line 31 "field5" should be changed to --$5--;
Column 6, line 32 "field3" should be changed to --$3--;
Column 6, line 35 field5.01" should be changed to --$5.01--;
Column 6, line 37 "field5" should be changed to --$5--;
Column 14, line 64 "field100" should be changed to --$100--;
Column 14, line 65 "field50" should be changed to --$50--;
Column 14, line 66 "field50" should be changed to --$50--;
Column 14, line 67 "field100" should be changed to --$100--;
Column 14, line 67 "field50" should be changed to --$50--;
Column 15, line 2 "field100" should be changed to --$100--;
Column 17, between lines 6 and 7, the heading --A/R Codes-- should be added;
Column 18, line 1 "field40" should be changed to --$40--;
Column 18, Claim 1, line 33 "consisting of" should be deleted;
Column 19, Claim 2, line 2 "consists" should be deleted;
Column 19, Claim 5, line 17 "consists of" should be deleted;
Column 19, Claim 6, line 20 "consisting of" should be deleted;
Column 22, Claim 25, lines 1-2 "consist of" should be deleted;
Column 22, Claim 32, line 32 "consisting of" should be deleted.

This certificate supersedes the Certificate of Correction issued May 19, 2009.

Signed and Sealed this

Ninth Day of June, 2009

JOHN DOLL
*Acting Director of the United States Patent and Trademark Office*